US010769549B2

(12) United States Patent
Bonawitz et al.

(10) Patent No.: US 10,769,549 B2
(45) Date of Patent: Sep. 8, 2020

(54) MANAGEMENT AND EVALUATION OF MACHINE-LEARNED MODELS BASED ON LOCALLY LOGGED DATA

(71) Applicant: Google Inc., Mountain View, CA (US)

(72) Inventors: Keith Bonawitz, Watchung, NJ (US); Daniel Ramage, Seattle, WA (US)

(73) Assignee: Google LLC, Mountain View, CA (US)

( * ) Notice: Subject to any disclaimer, the term of this patent is extended or adjusted under 35 U.S.C. 154(b) by 722 days.

(21) Appl. No.: 15/357,559

(22) Filed: Nov. 21, 2016

(65) Prior Publication Data
US 2018/0144265 A1 May 24, 2018

(51) Int. Cl.
*G06N 20/00* (2019.01)
*G06N 5/02* (2006.01)

(52) U.S. Cl.
CPC .............. *G06N 20/00* (2019.01); *G06N 5/022* (2013.01)

(58) Field of Classification Search
CPC ....... G06N 20/00; G06N 5/022; G06N 99/005
USPC .......................................................... 706/12
See application file for complete search history.

(56) References Cited

U.S. PATENT DOCUMENTS

| | | | |
|---|---|---|---|
| 6,708,163 B1 | 3/2004 | Kargupta et al. | |
| 6,961,685 B2 * | 11/2005 | Sy ........................ | G06Q 10/063 703/2 |
| 7,069,256 B1 * | 6/2006 | Campos ................... | G06N 3/02 706/16 |
| 7,664,249 B2 | 2/2010 | Horvitz et al. | |
| 8,190,537 B1 * | 5/2012 | Singh ..................... | G06N 20/00 706/12 |
| 8,239,396 B2 | 8/2012 | Byun et al. | |
| 8,321,412 B2 | 11/2012 | Yang et al. | |
| 8,429,103 B1 * | 4/2013 | Aradhye ................ | G06N 20/00 706/12 |

(Continued)

FOREIGN PATENT DOCUMENTS

WO   WO 2015126858   8/2015

OTHER PUBLICATIONS

Ramage et al., "Federated Optimization: Distributed Optimization Beyond the Datacenter" Nov. 11, 2015 Google, pp. 1-5. (Year: 2015).*

(Continued)

*Primary Examiner* — Miranda M Huang
*Assistant Examiner* — Chase P. Hinckley
(74) *Attorney, Agent, or Firm* — Dority & Manning, PA

(57) ABSTRACT

The present disclosure provides systems and methods for the management and/or evaluation of machine-learned models based on locally logged data. In one example, a user computing device can obtain a machine-learned model (e.g., from a server computing device) and can evaluate at least one performance metric for the machine-learned model. In particular, the at least one performance metric for the machine-learned model can be evaluated relative to data that is stored locally at the user computing device. The user computing device and/or the server computing device can determine whether to activate the machine-learned model on the user computing device based at least in part on the at least one performance metric. In another example, the user computing device can evaluate a plurality of machine-learned models against locally stored data. At least one of the models can be selected based on the evaluated performance metrics.

19 Claims, 7 Drawing Sheets

(56) References Cited

U.S. PATENT DOCUMENTS

| | | | |
|---|---|---|---|
| 8,954,357 B2 | 2/2015 | Faddoul et al. | |
| 9,053,436 B2* | 6/2015 | Dalessandro | G06N 5/02 |
| 9,190,055 B1 | 11/2015 | Kiss et al. | |
| 9,275,398 B1 | 3/2016 | Kumar et al. | |
| 9,336,483 B1 | 5/2016 | Abeysooriya et al. | |
| 9,390,370 B2 | 7/2016 | Kingsbury | |
| 9,424,836 B2 | 8/2016 | Lee et al. | |
| 2005/0138571 A1 | 6/2005 | Keskar et al. | |
| 2006/0002532 A1* | 1/2006 | Horvitz | H04L 41/147 379/112.01 |
| 2006/0224579 A1* | 10/2006 | Zheng | G06F 16/951 |
| 2008/0189632 A1* | 8/2008 | Tien | G06Q 30/02 715/764 |
| 2008/0209031 A1 | 8/2008 | Zhu et al. | |
| 2010/0132044 A1 | 5/2010 | Kogan et al. | |
| 2011/0022615 A1* | 1/2011 | Yang | G06F 16/435 707/758 |
| 2012/0016816 A1* | 1/2012 | Yanase | G06N 20/00 706/10 |
| 2012/0226639 A1 | 9/2012 | Burdick et al. | |
| 2012/0284213 A1* | 11/2012 | Lin | G06N 20/00 706/12 |
| 2013/0198119 A1* | 8/2013 | Eberhardt, III | G06N 20/00 706/12 |
| 2014/0122387 A1* | 5/2014 | Chi | G06N 20/00 706/12 |
| 2014/0180738 A1* | 6/2014 | Phillipps | G06Q 10/0631 705/7.12 |
| 2014/0188768 A1* | 7/2014 | Bonissone | G06N 20/00 706/12 |
| 2014/0372346 A1* | 12/2014 | Phillipps | G06N 20/00 706/12 |
| 2015/0186798 A1 | 7/2015 | Vasseur et al. | |
| 2015/0193695 A1 | 7/2015 | Cruz Mota et al. | |
| 2015/0195144 A1 | 7/2015 | Vasseur et al. | |
| 2015/0242760 A1* | 8/2015 | Miao | H04L 67/42 706/12 |
| 2015/0324686 A1* | 11/2015 | Julian | G06N 20/00 706/25 |
| 2015/0339572 A1* | 11/2015 | Achin | G06N 5/02 706/46 |
| 2015/0356451 A1* | 12/2015 | Gupta | G06N 20/00 706/52 |
| 2015/0379429 A1* | 12/2015 | Lee | G06N 20/00 706/11 |
| 2016/0071025 A1* | 3/2016 | Brand | G06N 5/02 706/12 |
| 2016/0092312 A1* | 3/2016 | Dornquast | G06F 16/178 707/692 |
| 2016/0132787 A1* | 5/2016 | Drevo | G06N 20/00 706/12 |
| 2016/0275406 A1* | 9/2016 | Chan | G06F 16/248 |
| 2016/0350671 A1* | 12/2016 | Morris, II | G06N 20/00 |
| 2016/0371585 A1* | 12/2016 | McElhinney | G06F 17/5009 |
| 2017/0046510 A1* | 2/2017 | Chen | G06F 21/552 |
| 2017/0063886 A1* | 3/2017 | Muddu | G06F 16/254 |
| 2017/0193066 A1* | 7/2017 | Zhu | G06N 20/00 |
| 2018/0018590 A1* | 1/2018 | Szeto | G06N 20/00 |
| 2018/0034715 A1* | 2/2018 | Nagaraju | G06F 16/9038 |
| 2018/0039905 A1* | 2/2018 | Anghel | G06F 9/50 |
| 2018/0113742 A1* | 4/2018 | Chung | G06F 9/5005 |
| 2018/0121964 A1* | 5/2018 | Zhang | G06Q 30/0269 |
| 2020/0034197 A1* | 1/2020 | Nagpal | G06F 9/50 |

OTHER PUBLICATIONS

Guan et al., "Ensemble of Bayesian Predictors for Autonomic Failure Management in Cloud Computing" Jul. 31-Aug. 4, 2011 IEEE Proceedings of the 20th International Conference on Computer Communications and Networks. (Year: 2011).*

Hu et al., "Online Adaboost-Based Parameterized Methods for Dynamic Distributed Network Intrusion Detection" Jan. 2014, IEEE Transactions on Cybernetics, vol. 44, No. 1, pp. 66-82. (Year: 2014).*

International Search Report for PCT/US2017/053187 dated Dec. 14, 2017, 12 pages.

Bermudez-Chacon et al., Automatic Problem-Specific Hyperparameter Optimization and Model Selection for Supervised Machine Learning: Technical Report, Zurich, Switzerland, 2015, 53 pages.

Lokuciejewski et al., "Automatic Selection of Machine Learning Models for Compiler Heuristic Generation", Dortmund, Germany, 15 pages.

Dwork et al., "Pan-Private Streaming Algorithms", Proceedings in the First Symposium on Innovations in Computer Science, Beijing, China, Jan. 5-7, 2010, 32 pages.

Konecny et al., "Federated Optimization: Distributed Machine Learning for On-Device Intelligence", arXiv:1610.02527, Oct. 8, 2016, 38 pages.

Konecny et al., "Federated Optimization: Distributed Optimization Beyond the Datacenter", arXiv:1511.03575, Nov. 11, 2015, 5 pages.

McMahan et al., "Communication-Efficient Learning of Deep Networks from Decentralized Data", arXiv:1602.05629, Oct. 21, 2016, 10 pages.

* cited by examiner

MANAGEMENT AND EVALUATION OF MACHINE-LEARNED MODELS BASED ON LOCALLY LOGGED DATA

FIELD

The present disclosure relates generally to user data and machine learning. More particularly, the present disclosure relates to the management and/or evaluation of machine-learned models based on locally logged data.

BACKGROUND

User computing devices such as, for example, smart phones, tablets, and/or other mobile computing devices continue to become increasingly: (a) ubiquitous; (b) computationally powerful; (c) endowed with significant local storage; and (d) privy to potentially sensitive data about users, their actions, and their environments. In addition, applications delivered on mobile devices are also increasingly data-driven. For example, in many scenarios, data that is collected from user computing devices is used to train and evaluate new machine-learned models, personalize features, and compute metrics to assess product quality.

Many of these tasks have traditionally been performed centrally (e.g., by a server computing device). In particular, in some scenarios, data can be uploaded from user computing devices to the server computing device. The server computing device can train various machine-learned models on the centrally collected data and then evaluate the trained models. The trained models can be used by the server computing device or can be downloaded to user computing devices for use at the user computing device. In addition, in some scenarios, personalizable features can be delivered from the server computing device. Likewise, the server computing device can compute metrics across users on centrally logged data for quality assessment.

However, frequently it is not known exactly how data will be useful in the future and, particularly, which data will be useful. Thus, without a sufficient history of logged data, certain machine-learned models or other data-driven applications may not be realizable. Stated differently, if a certain set or type of data that is needed to train a model, personalize a feature, or compute a metric of interest was not logged, then even after determining that a certain kind of data is useful and should be logged, there is still a significant wait time until enough data to be generated to enable such training, personalization, or computation.

One possible response to this problem would be to log any and all data centrally. However, this response comes with its own drawbacks. In particular, users use their mobile devices for all manner of privacy-sensitive activities. Mobile devices are also increasingly sensor-rich, which can result in giving the device access to further privacy-sensitive data streams from their surroundings. Thus, privacy considerations suggest that logging should be done prudently—rather than wholesale—to minimize the privacy risks to the user.

Beyond privacy, the data streams these devices can produce are becoming increasingly high bandwidth. Thus, in many cases it is simply infeasible to stream any and all user data to a centralized database, even if doing so was desirable.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to manage machine-learned models. The method includes obtaining, by a user computing device, a plurality of machine-learned models. The method includes evaluating, by the user computing device, at least one performance metric for each of the plurality of machine-learned models. The at least one performance metric for each machine-learned model is evaluated relative to data that is stored locally at the user computing device. The method includes determining, by the user computing device, a selection of a first machine-learned model from the plurality of machine-learned models based at least in part on the performance metrics respectively evaluated for the plurality of machine-learned models. The method includes using, by the user computing device, the selected first machine-learned model to obtain one or more predictions.

Another example aspect of the present disclosure is directed to a computing device. The computing device includes one or more processors and one or more non-transitory computer-readable media that collectively store instructions that, when executed by the one or more processors, cause the computing device to perform operations. Execution of the instructions causes the computing device to obtain a machine-learned model. Execution of the instructions causes the computing device to evaluate at least one performance metric for the machine-learned model. The at least one performance metric for the machine-learned model is evaluated relative to data that is stored locally at the computing device. Execution of the instructions causes the computing device to determine whether to activate the machine-learned model based at least in part on the at least one performance metric evaluated for the machine-learned model. Execution of the instructions causes the computing device to use the machine-learned model to obtain one or more predictions when it is determined that the machine-learned model should be activated.

Another example aspect of the present disclosure is directed to one or more non-transitory computer-readable media that collectively store instructions that, when executed by one or more processors of a computing system, cause the computing system to perform operations. Execution of the instructions causes the computing system to obtain a plurality of performance metrics respectively associated with a plurality of machine-learned models. The performance metric for each machine-learned model indicates a performance of such machine-learned model when evaluated against a set of data that is stored locally at a user computing device. Execution of the instructions causes the computing system to select at least one of the plurality of machine-learned models based at least in part on the plurality of performance metrics. Execution of the instructions causes the computing system to cause use of the selected at least one machine-learned model at the user computing device.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1A:
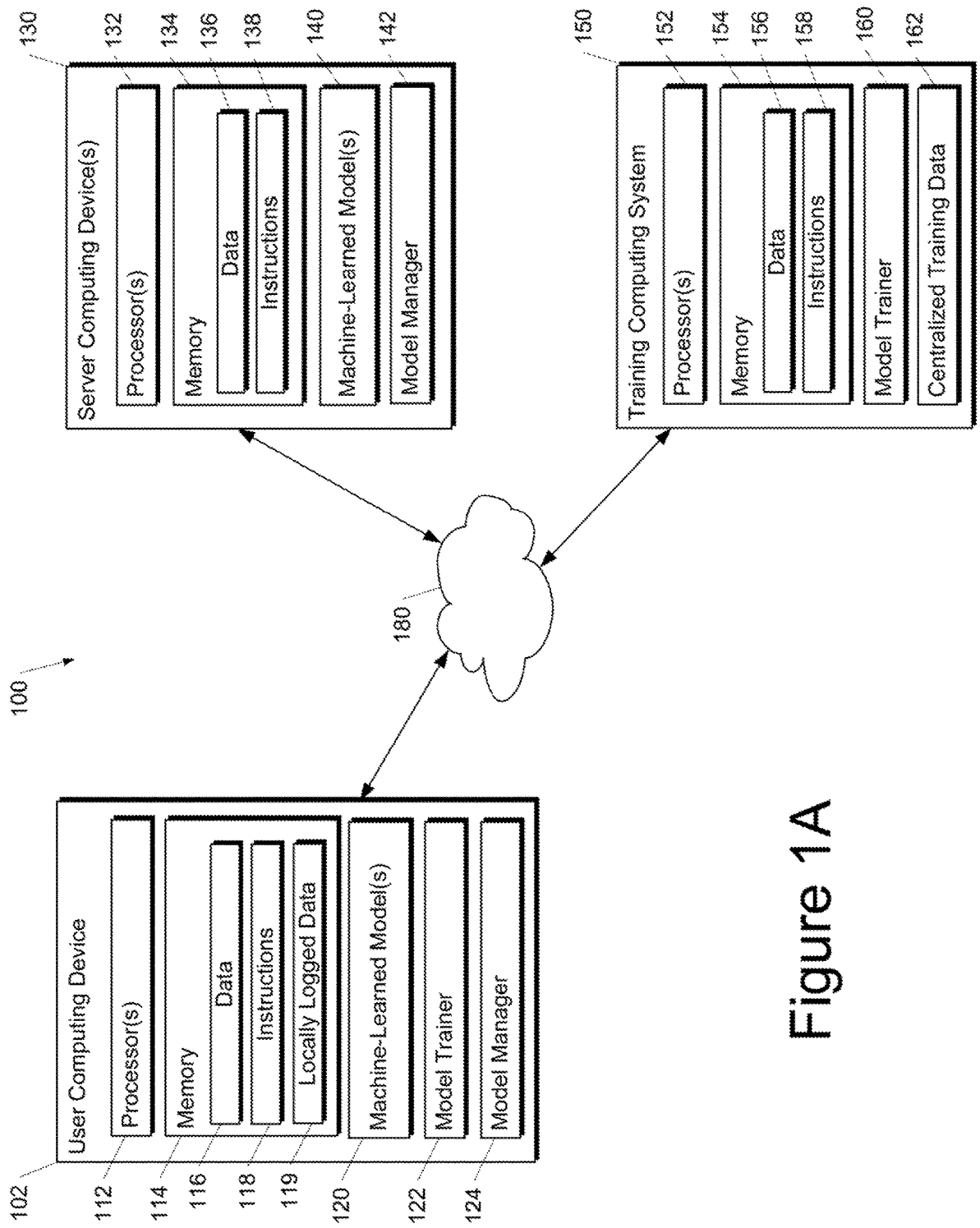
FIG. 1A depicts a block diagram of an example computing system that performs model management and evaluation based on locally logged data according to example embodiments of the present disclosure.

Generally, the present disclosure is directed to the management and/or evaluation of machine-learned models based on locally logged data. In particular, the systems and methods of the present disclosure can leverage the availability of significant amounts of data that have been logged locally at a user computing device, as opposed to the traditional centralized collection of data. In one example, a user computing device can obtain a machine-learned model (e.g., from a server computing device) and can evaluate at least one performance metric for the machine-learned model. In particular, the at least one performance metric for the machine-learned model can be evaluated relative to data that is stored locally at the user computing device. The user computing device and/or the server computing device can determine whether to activate the machine-learned model on the user computing device based at least in part on the at least one performance metric. In another example, the user computing device can obtain a plurality of machine-learned models and can evaluate at least one performance metric for each of the plurality of machine-learned models relative to the data that is stored locally at the user computing device. The user computing device and/or server computing device can select at least one of machine-learned models for use at the user computing device based at least in part on the performance metrics. For example, the model with the best performance metric(s) can be selected for activation and use at the user computing device.

Thus, the present disclosure provides improved techniques for model management and evaluation which leverage the existence of locally logged user data. For example, one or more models can be evaluated prior to activation to determine how much value each of such models would bring if it were enabled as a user-visible feature. As a result of such evaluation process, the systems of the present disclosure can make decisions regarding use and activation of machine-learned models that are more informed and user-specific. In addition, since the user data is stored locally at the user computing device, rather than uploaded for storage at a central server, user privacy is enhanced.

More particularly, aspects of the present disclosure are based on a recognition that that the traditional 'log centrally' vs. 'don't log' tension is a false dichotomy. Instead, according to aspects of the present disclosure, user data can be logged locally to on-device storage. In such fashion, the data stays with the user, thereby increasing user privacy.

In particular, according to an aspect of the present disclosure, applications and/or operating systems implemented on a user computing device (e.g., a mobile computing device such as a smartphone) can provide a local, on-device database to which log entries are written. In some implementations, the database(s) may or may not be inspectable by a user. Log entries in the database may or may not expire (e.g., due to time-to-live constraints, storage space constraints, or other constraints). Furthermore, log entries may or may not be expungable by a user. Logging to the database(s) can be logically similar to logging to a central, server-stored database, but logs can be placed in secure local storage that does not leave the device.

According to an aspect of the present disclosure, when it is desirable to train a model, personalize a feature, or compute a metric, the computation can be sent to the data, rather than vice versa. According to this approach, only a minimal amount of information necessary to perform the specific action is collected centrally. In some instances, the use of locally logged data to provide personalized features and/or perform model training and/or management can result in no central collection of user data at all. In particular, in some implementations, application libraries and/or operating systems of the user computing device can provide support for running analyses against this local database, thereby eliminating the need to upload data centrally for analysis or use.

As one example, in some implementations, a new machine-learned model can be trained by the user computing device based on the locally logged data. In particular, an untrained model structure and a training algorithm can be provided to the user computing device (e.g., from a server computing device). The user computing device can be instructed to use the entries in the local database (or some subset thereof) as training data for the training algorithm. Thereafter, the newly trained machine intelligence model can be used immediately to deliver predictions, which may be useful in any number of scenarios. Alternatively, as will be discussed further below, the trained model can be evaluated prior to activation.

In some implementations, the machine-learned model can be delivered to the user computing device partially or fully pre-trained. For example, the server computing device can partially or fully train the model on centrally collected data prior to transmitting the model to the user computing device. In some of such implementations, the user computing device can further train the model against the local log database. In some instances, this additional local training can be viewed as personalizing the model.

In some implementations, some information about the trained model's parameters can be delivered by the user computing device back to the server computing device. For example, the server computing device can use the returned parameter information to construct a cross-population model.

According to another aspect of the present disclosure, in some implementations, the user computing device can evaluate at least one performance metric for the machine-learned model relative to data that is stored locally at the user computing device. For example, the performance metric can be used to determine how much value the new model would bring if it were activated as a user-visible feature. One example performance metric is an average probability of correct prediction. Another example performance metric is expected utility of the model. For example, the expected utility can include a number of user interactions saved/eliminated. Statistics about the prediction performance could either be logged locally for future analysis or logged centrally.

As one example, the user computing device can evaluate the machine-learned model based on its ability to predict future user behavior. In particular, the user computing device can use new local data that is newly logged after receipt and/or training of the machine-learned model to evaluate the at least one performance metric for the machine-learned model. For example, the model can be employed to make predictions based on newly received data. In some implementations, the predictions are not used to provide user features or otherwise affect the performance of the device or application, but instead are compared to new ground truth data to assess the predictions' correctness.

Alternatively or additionally, the user computing device can evaluate the machine-learned model against previously logged local data. In particular, the user computing device can use historical data that was previously logged at the user computing device to evaluate the at least one performance metric. Thus, a machine-learned model can be evaluated against previously collected historical data and/or against newly collected data.

According to another aspect of the present disclosure, the user computing device and/or server computing device can determine whether to activate the machine-learned model based at least in part on the at least one performance metric. For example, if the performance metric(s) compare favorably to one or more performance thresholds, then the model can be activated for use at the user computing device. In various implementations, the user computing device can determine whether to activate the model or the user computing device can provide the performance metric(s) to the server computing device and the server computing device can determine whether to activate the model.

According to another aspect of the present disclosure, in some implementations, rather than receive and/or train a single machine-learned model, the user computing device can receive and/or train a plurality of machine-learned models. For example, the server computing device can have trained the plurality of machine-learned models on different types of training data.

The user computing device can evaluate at least one performance metric for each of the plurality of machine-learned models. In particular, the user computing device can evaluate the at least one performance metric for each machine-learned model relative to data that is stored locally at the user computing device. For example, the locally stored data can be newly received data or can be previously logged data, as described above.

The user computing device and/or server computing device can select one of the machine-learned models based at least in part on the performance metrics. For example, the model with the best performance metric(s) can be selected for activation and use at the user computing device. As noted, the user computing device can perform the selection or the user computing device can provide the performance metrics to the server computing device and the server computing device can perform the selection.

To provide a particular example, a server computing device can have trained three different machine-learned models to predict a next word will be entered into a text messaging application (e.g., based on a previously entered string). However, the machine-learned models can have been trained on different types of training data. For example, a first model can have been trained on publically-available literature (e.g., books); a second model can have been trained on publically-available social media posts; and a third model can have been trained on publically-available electronic mail conversations. The server computing device can provide the three models to the user computing device.

Prior to activating any of the models, the user computing device can evaluate at least one performance metric for each of the three models relative to locally stored data. For example, the locally stored data can include previously logged instances of text input by the user into the text messaging application and/or newly logged instances of text input by the user into the text messaging application. As an example, the user computing device can determine, for each of the models, an average probability of correctly predicting the next word when given a portion of one of the logged instances of text input.

The user computing device and/or server computing device can select one of the three models based on the evaluated performance metrics. As an example, if the model trained on the publically-available electronic mail conversations was found to have the highest average probability of correctly predicting the next word, then such model can be activated and used at the user computing device. For example, the selected model can be used to predict a next word which can be surfaced within an autocomplete feature of the text messaging application on the user computing device.

In further implementations, the selected model can be personalized based on the locally stored data prior to activation. In yet further implementations, if two or more models perform favorably relative to one or more thresholds, then the two or more models can be aggregated to form a single model that is then activated (or personalized and activated). As an example, the two or more models that performed favorably relative to the one or more thresholds can be aggregated according to a weighted average, where the weight respectively applied to each of the two or more models is a function of the respective performance metric evaluated for such model (e.g., more favorably performing models can receive increased weight).

According to yet another aspect of the present disclosure, metrics based on typical aggregating queries can also be computed against the locally logged data. The contribution from each user to the overall metric can be computed on the user computing device. In some instances, these per-user aggregates are sufficiently small and de-privatized that they can be delivered to a central server for further cross-user aggregation without exposure of sensitive data. In other instances, to enhance user privacy, differential privacy can be used to introduce noise into the per-user aggregates before they are delivered to the central server for cross-user aggregation.

In some implementations, per-user aggregates can be combined across many users securely using encryption techniques before delivering the resulting cross-user aggregate to the central server. In still other instances, to yet further enhance user privacy, differential privacy can be used to add noise to the cryptographically computed cross-user aggregates during the cryptographic aggregation process before delivering the result to a central server.

According to another aspect of the present disclosure, user privacy can be further enhanced by not keeping the complete stream of certain forms of data on the user computing device. For example, in some implementations, a summary of the locally logged data can be stored on the user computing device rather than the user data itself. As examples, the summary can be a standard aggregate measure such as maximum value, minimum value, mean value, histogram counts, etc. As another example, the summary could a machine-learned model trained from streaming data.

As yet another example, the summary itself could be stored and updated in a privacy-preserving manner through the use of pan-private techniques. For example, pan-private techniques can be used that inject noise into a streaming algorithm to achieve differential privacy guarantees on the internal states of that algorithm as well as on its output.

According to yet another aspect of the present disclosure, in some implementations, the local database of the user computing device or a summarized version of the local database can be stored in an encrypted form. In some implementations, the local database or a summarized version of the local database can be directly accessible only via privileged software (e.g., tasks in the operating system operating with special permissions) or privileged hardware (e.g. trusted computed hardware, such as a Trusted Platform Module).

With reference now to the Figures, example embodiments of the present disclosure will be discussed in further detail.

Example Devices and Systems

FIG. 1A depicts a block diagram of an example computing system 100 that performs model management and evaluation based on locally logged data according to example embodiments of the present disclosure. The system 100 includes a user computing device 102, a server computing device 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, a personal assistant computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

Furthermore, according to an aspect of the present disclosure, the memory 114 of the user computing device 102 cam include locally logged data 119. In particular, applications and/or operating systems implemented on the user computing device 102 can provide a local, on-device database in memory 114 to which log entries are written. One database can be used or multiple databases can be used. In some implementations, the database(s) may or may not be inspectable by a user. Log entries in the database may or may not expire (e.g., due to time-to-live constraints, storage space constraints, or other constraints). Furthermore, log entries may or may not be expungable by a user. Logging to the database(s) can be logically similar to logging to a central, server-stored database, but logs can be placed in secure local storage that does not leave the device.

According to another aspect of the present disclosure, the user computing device 102 can store or include one or more machine-learned models 120. The machine-learned models 120 can be or can otherwise include one or more neural networks (e.g., deep neural networks); Markov models (e.g., hidden Markov models); classifiers; regression models; support vector machines; Bayesian networks; multi-layer non-linear models; or other types of machine-learned models. Neural networks (e.g., deep neural networks) can be feed-forward neural networks, convolutional neural networks, autoencoders, recurrent neural networks (e.g., long short-term memory neural network, gated recurrent units, etc.) and/or various other types of neural networks.

In some implementations, the one or more machine-learned models 120 can be received from the server computing device 130 over network 180, stored in the user computing device memory 114, and then used or otherwise implemented by the one or more processors 112. In some implementations, the user computing device 102 can implement multiple parallel instances of a single machine-learned model 120.

More particularly, machine-learned model(s) 120 can be implemented to provide predictions in various situations or applications. As one example, the machine-learned model(s) 120 can be employed within the context of a text messaging application of the user computing device 102, an email application of the user computing device 102, a text composition interface of an application (e.g., a word processing application), or any other application. As other examples, the machine-learned model(s) 120 can be included as a browser plug-in, as an overlay or feature of a keyboard (e.g., a virtual keyboard on the user computing device 102), or in other contexts. Thus, the machine-learned model(s) 120 can receive and analyze data from various applications or other computing device components and can produce predictions on the basis of such data. The predictions can be used for various features.

Additionally or alternatively, one or more machine-learned models 140 can be included in or otherwise stored and implemented by the server computing device 130 that communicates with the user computing device 102 according to a client-server relationship. For example, the machine-learned models 140 can be implemented by the server computing device 140 as a portion of a web service (e.g., a web email service). Thus, one or more models 120 can be stored and implemented at the user computing device 102 and/or one or more models 140 can be stored and implemented at the server computing device 130.

The user computing device 102 can also include a model trainer 122. The model trainer 122 can train or re-train one or more of the machine-learned models 120 stored at the user computing device 102 using various training or learning techniques, such as, for example, backwards propagation of errors (e.g., truncated backpropagation through time). In particular, the model trainer 122 can train or re-train one or more of the machine-learned models 120 using the locally logged data 119 as training data. The model trainer 122 can perform a number of generalization techniques (e.g., weight decays, dropouts, etc.) to improve the generalization capability of the models being trained.

As one example, in some implementations, a new machine-learned model 120 can be trained by the model trainer 122 based on the locally logged data 124. In particular, an untrained model structure and a training algorithm can be provided to the user computing device 102 (e.g., from the server computing device 130). The model trainer 122 can use the locally logged data 119 (or some subset thereof) as training data for the training algorithm. Thereafter, the newly trained machine intelligence model 120 can be used immediately to deliver predictions, which may be useful in any number of scenarios. Alternatively, as will be discussed further below, the trained model 120 can be evaluated prior to activation.

In some implementations, the machine-learned model 120 can be delivered to the user computing device 102 partially or fully pre-trained. For example, the server computing device 130 can partially or fully train a model 140 (e.g., through cooperation with training computing system 150) on centrally collected data 162 prior to transmitting the model 140 to the user computing device 102, where it is then stored as a model 120. In some of such implementations, the user computing device 102 can implement the model trainer 122 to further train the model 120 against the local log database 119. In some instances, this additional local training can be viewed as personalizing the model 120.

In some implementations, some information about the trained model's parameters can be delivered by the user computing device 102 back to the server computing device 130. For example, the server computing device 130 can use the returned parameter information to construct a cross-population model.

According to another aspect of the present disclosure, the user computing device 102 can also include a model manager 124 that performs management and/or evaluation of one or more of the machine-learned models 120. For example, the model manager 124 can evaluate at least one performance metric for each of the machine-learned models 120 based on the locally logged data 119. For example, the performance metric can be used to determine how much value the model 120 would bring if it were activated as a user-visible feature. One example performance metric is an average probability of correct prediction. Statistics about the prediction performance could either be logged locally for future analysis or logged centrally (e.g., at the server computing device 130).

As one example evaluation technique, the model manager 124 can evaluate the machine-learned model 120 based on its ability to predict future user behavior. In particular, the model manager 124 can use new local data 119 that is newly logged after receipt and/or training of the machine-learned model 120 to evaluate the at least one performance metric for the machine-learned model 120. For example, the model 120 can be employed to make predictions based on newly logged data 119. In some implementations, the predictions are not used to provide user features or otherwise affect the performance of the device or application, but instead are compared to new ground truth data to assess the predictions' correctness.

Alternatively or additionally, the model manager 124 can evaluate the machine-learned model 120 against previously logged local data 119. In particular, the model manager 124 can use historical data 119 that was previously logged at the user computing device 102 to evaluate the at least one performance metric. Thus, a machine-learned model 120 can be evaluated against previously collected historical data and/or against newly collected data.

According to another aspect of the present disclosure, the model manager 124 can determine whether to activate the machine-learned model 120 based at least in part on the at least one performance metric. For example, if the performance metric(s) compare favorably to one or more performance thresholds, then the model 120 can be activated for use at the user computing device 102. In other implementations, the user computing device 102 can provide the performance metric(s) to the server computing device 130 and a model manager 142 located at the server computing device 130 can determine whether to activate the model 120 on the user computing device 102. Thus, decisions regarding activation of a particular model 120 can be performed at the user computing device 102 or the server computing device 130.

According to another aspect of the present disclosure, in some implementations, rather than receive and/or train a single machine-learned model 120, the user computing device 102 can receive and/or train a plurality of machine-learned models 120. For example, the server computing device 130 can have trained (e.g., through cooperation with training computing system 150) a plurality of machine-learned models 140 on different types of training data and then transmitted such models 140 to the user computing device 102, where they are stored as models 120.

The model manager 124 can evaluate at least one performance metric for each of the plurality of machine-learned models 120, as described above. The model manager 124 and/or model manager 142 can select one of the machine-learned models 120 based at least in part on the performance metrics. For example, the model 120 with the best performance metric(s) can be selected for activation and use at the user computing device 102. As noted, the model manager 124 can perform the selection or the user computing device 102 can provide the performance metrics to the server computing device 130 and the model manager 142 can perform the selection.

In further implementations, the selected model 120 can be personalized (e.g., by model trainer 122) based on the locally stored data 119 prior to activation. In yet further implementations, if two or more models 120 perform favorably relative to one or more thresholds, then the two or more models 120 can be aggregated to form a single model 120 that is then activated (or personalized and activated).

The server computing device 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing device 130 to perform operations.

In some implementations, the server computing device 130 includes or is otherwise implemented by one or more server computing devices. In instances in which the server computing device 130 includes plural server computing devices, such server computing devices can operate according to sequential computing architectures, parallel computing architectures, or some combination thereof.

As described above, the server computing device 130 can store or otherwise includes one or more machine-learned models 140. The machine-learned models 120 can be or can otherwise include one or more neural networks (e.g., deep neural networks); Markov models (e.g., hidden Markov models); classifiers; regression models; support vector machines; Bayesian networks; multi-layer non-linear models; or other types of machine-learned models. Neural networks (e.g., deep neural networks) can be feed-forward neural networks, convolutional neural networks, autoencoders, recurrent neural networks (e.g., long short-term memory neural network, gated recurrent units, etc.) and/or various other types of neural networks.

The server computing device 130 can train the machine-learned models 140 via interaction with the training computing system 150 that is communicatively coupled over the network 180. The training computing system 150 can be separate from the server computing device 130 or can be a portion of the server computing device 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing device 130 using various training or learning techniques, such as, for example, backwards propagation of errors (e.g., truncated backpropagation through time). The model trainer 160 can perform a number of generalization techniques (e.g., weight decays, dropouts, etc.) to improve the generalization capability of the models being trained. In particular, the model trainer 160 can train a machine-learned model 140 based on a set of training data 162. The training data 162 can includes centrally collected data.

Each of the model trainer 122, model manager 124, model manager 142, and model trainer 160 can include computer logic utilized to provide desired functionality. Each of the model trainer 122, model manager 124, model manager 142, and model trainer 160 can be implemented in hardware, firmware, and/or software controlling a general purpose processor. For example, in some implementations, each of the model trainer 122, model manager 124, model manager 142, and model trainer 160 includes program files stored on a storage device, loaded into a memory and executed by one or more processors. In other implementations, each of the model trainer 122, model manager 124, model manager 142, and model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, only the user computing device 102 includes a model trainer and model manager. For example, in some implementations, server computing device 130 does not include manager 142 and the system 100 does not include the training computing system 150. In some implementations, the system 100 includes only the user computing device 102.

Figure 1B:
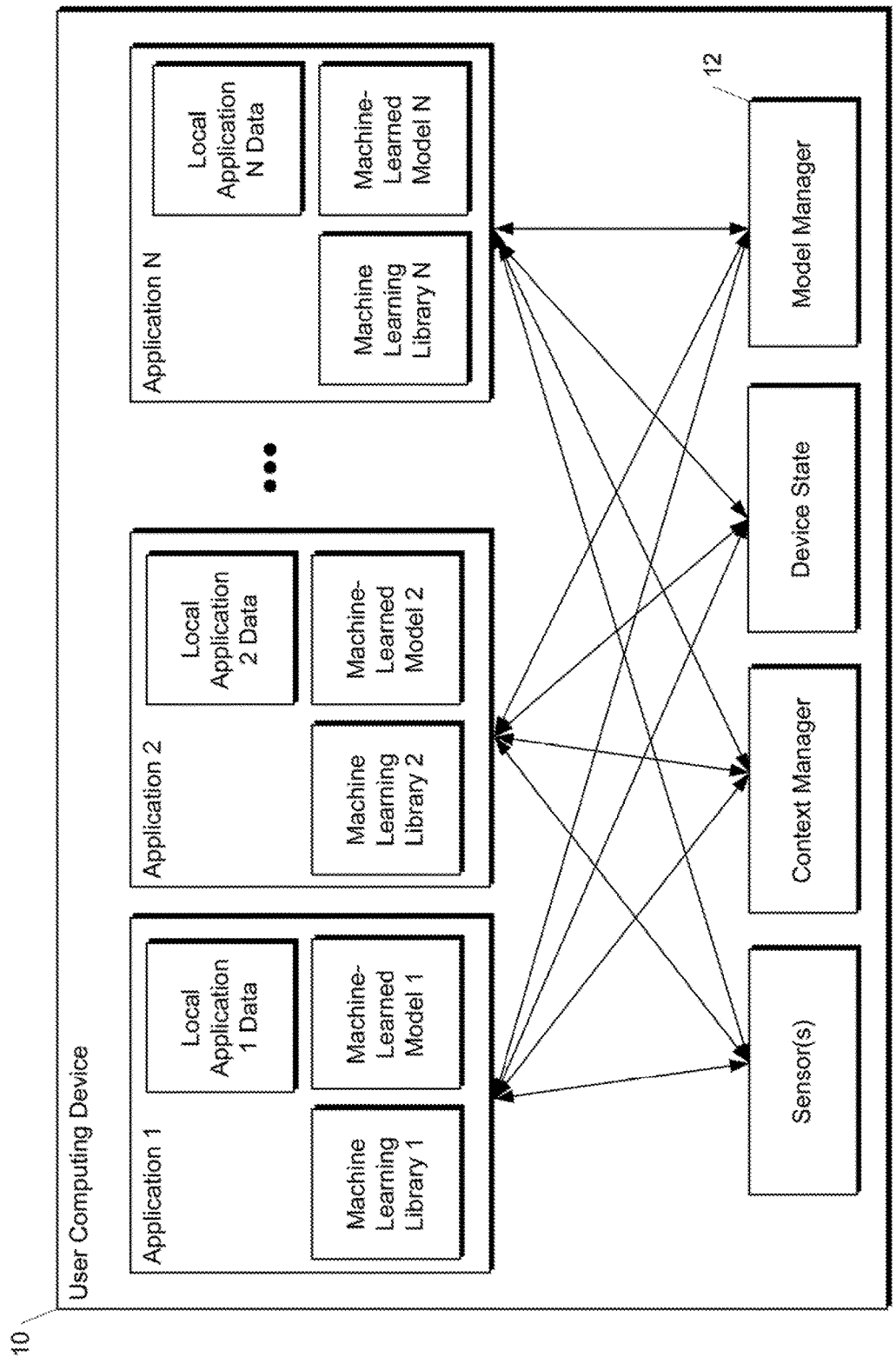
FIG. 1B depicts a block diagram of an example computing device that performs model management and evaluation based on locally logged data according to example embodiments of the present disclosure.

FIG. 1B depicts a block diagram of an example computing device 10 that performs model management and evaluation based on locally logged data according to example embodiments of the present disclosure.

The computing device 10 includes a number of applications (e.g., applications 1 through N). Each application can contain its own machine learning library and machine-learned model(s). Example applications include a text messaging application, an email application, a virtual keyboard application, a browser application, a photograph management application, a music streaming application, a rideshare application, or any other type of application.

Each application 1 through N also includes local application data. In particular, each application can provide or otherwise communicate with a local, on-device database in memory to which log entries are written. One database can be used for all applications or different respective databases can be used for each application. In some implementations, the database(s) may or may not be inspectable by a user. Log entries in the database(s) may or may not expire (e.g., due to time-to-live constraints, storage space constraints, or other constraints). Furthermore, log entries may or may not be expungable by a user. Logging to the database(s) can be logically similar to logging to a central, server-stored database, but logs can be placed in secure local storage that does not leave the device.

The user computing device 10 can also include a model manager 12 that performs management and/or evaluation of one or more of the machine-learned models included in the applications. In some implementations, the model manager 12 can be implemented by an operating system of the user computing device 10. In other implementations of the present disclosure, each application 1 through N can include its own respective, dedicated model manager, rather than a single model manager 12 for the entire device 10.

The model manager 12 can evaluate at least one performance metric for each of the machine-learned models based on the respective local application data. For example, machine-learned model 1 can be evaluated against local application 1 data, and so forth. The evaluated performance metric can be used to determine how much value the machine-learned model 1 would bring if it were activated as a user-visible feature within application 1. The local application 1 data used for evaluation purposes can be previously logged data or newly logged data.

The model manager 12 can determine whether to activate the machine-learned models based at least in part on the at least one performance metric. For example, if the performance metric evaluated for machine-learned model 1 (e.g., relative to local application 1 data) compares favorably to one or more performance thresholds, then machine-learned model 1 can be activated for use within application 1.

Figure 1C:
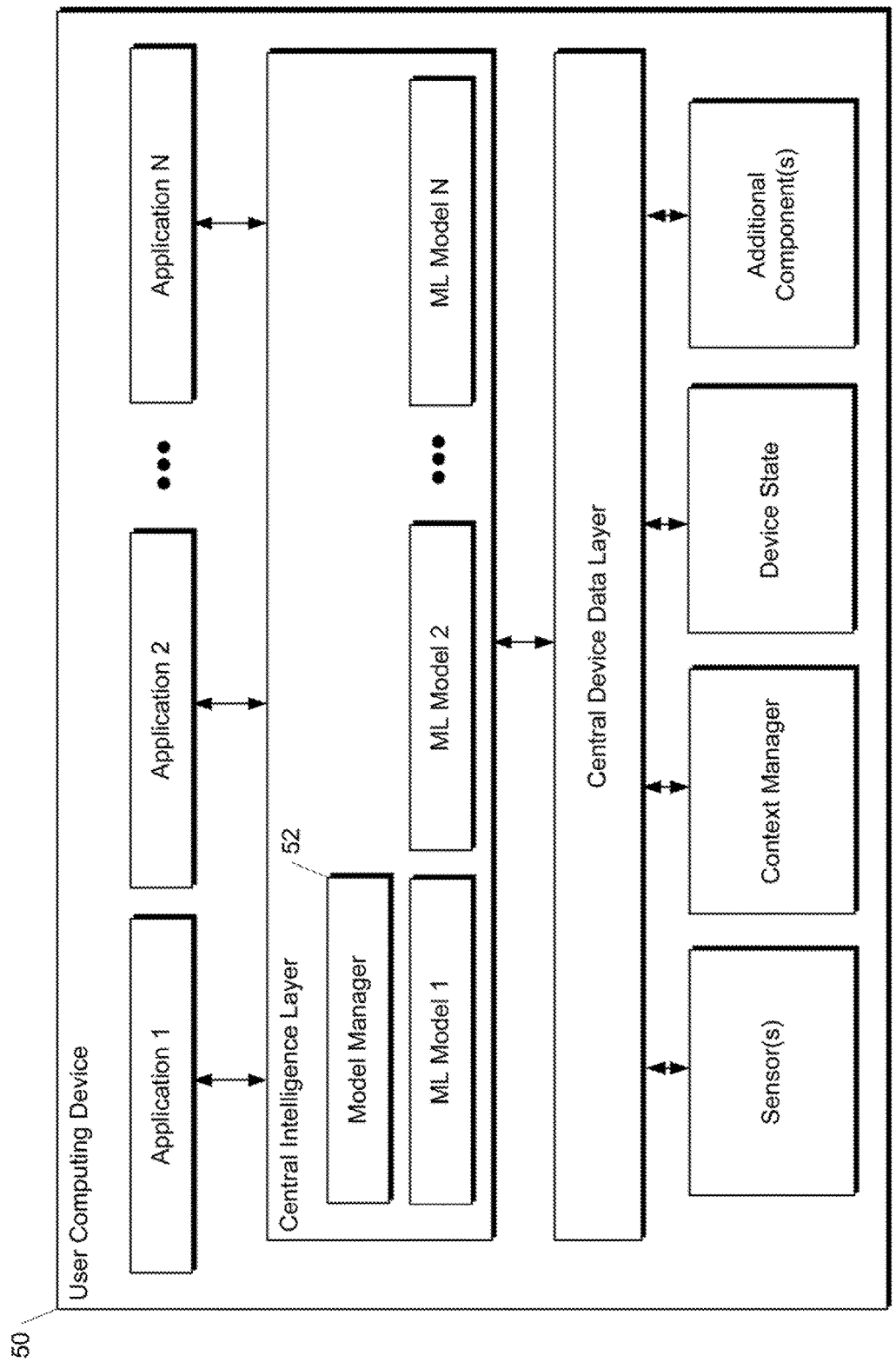
FIG. 1C depicts a block diagram of an example computing device that performs model management and evaluation based on locally logged data according to example embodiments of the present disclosure.

FIG. 1C depicts a block diagram of an example computing device 50 that performs model management and evaluation based on locally logged data according to example embodiments of the present disclosure.

The computing device 50 includes a number of applications (e.g., applications 1 through N). Each application is in communication with a central intelligence layer. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications.

The central intelligence layer can also include a model manager 52 that performs management and/or evaluation of one or more of the machine-learned models included in the applications. In some implementations, the model manager 52 can be implemented by an operating system of the user computing device 50.

The central intelligence layer can communicate with a central device data layer. The central device data layer can be a centralized repository of locally logged data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

The model manager 52 can evaluate at least one performance metric for one or more of the machine-learned models included in the central intelligence layer based on the locally logged data included in the central device data layer. For example, machine-learned model 1 can be evaluated against the locally logged data included in the central device data layer. The evaluated performance metric can be used to determine how much value the machine-learned model 1 would bring if it were activated as a user-visible feature within application 1. The locally logged data used for evaluation purposes can be previously logged data or newly logged data.

The model manager 52 can determine whether to activate the machine-learned models based at least in part on the at least one performance metric. For example, if the performance metric evaluated for machine-learned model 1 compares favorably to one or more performance thresholds, then machine-learned model 1 can be activated to provide predictions for use by application 1.

The computing devices shown in FIGS. 1B and 1C are examples only. Combinations of aspects of such devices can be used to implement the present disclosure as well.

Example Methods

Figure 2:
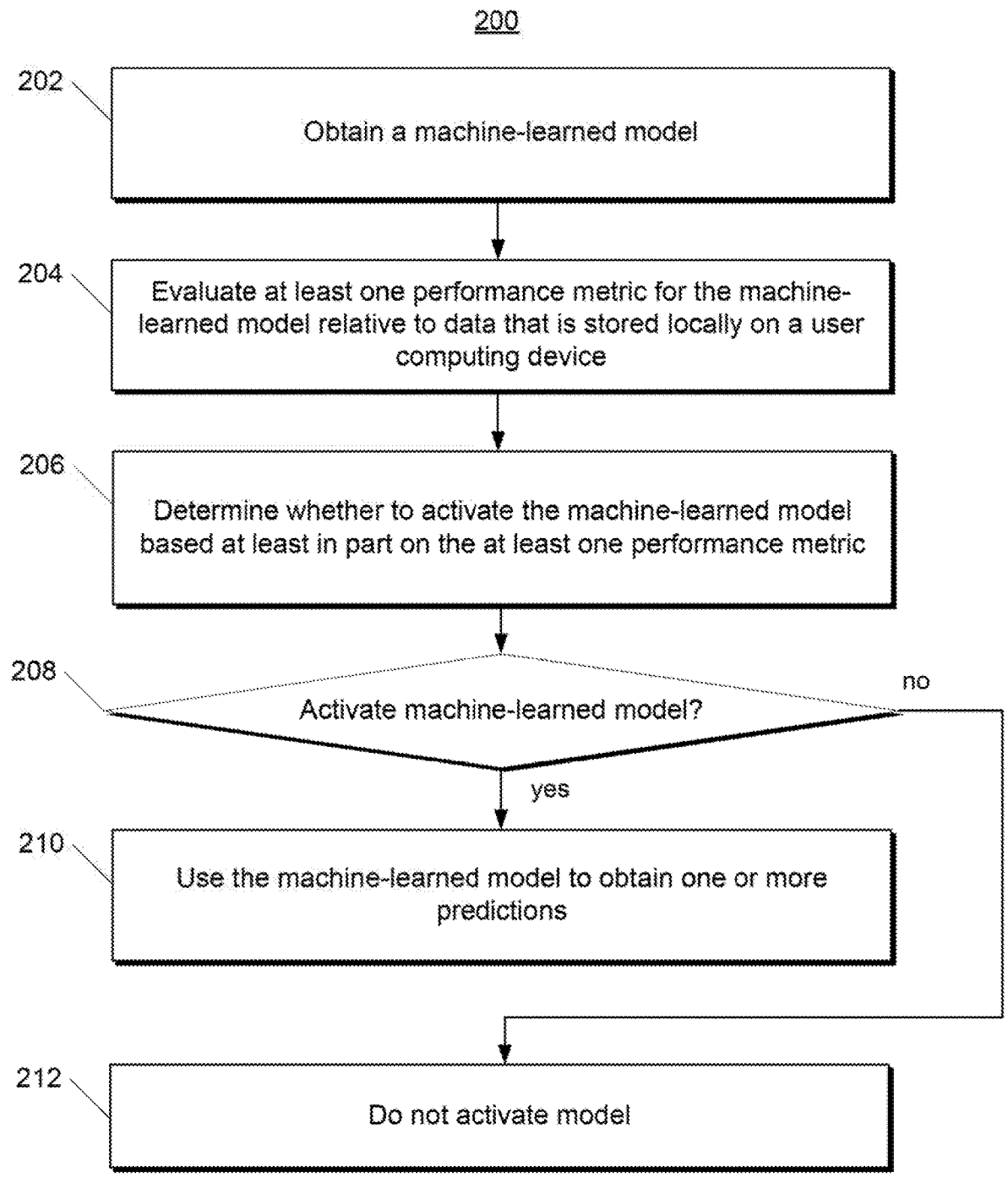
FIG. 2 depicts a flow chart diagram of an example method to manage a machine-learned model according to example embodiments of the present disclosure.
Figure 3:
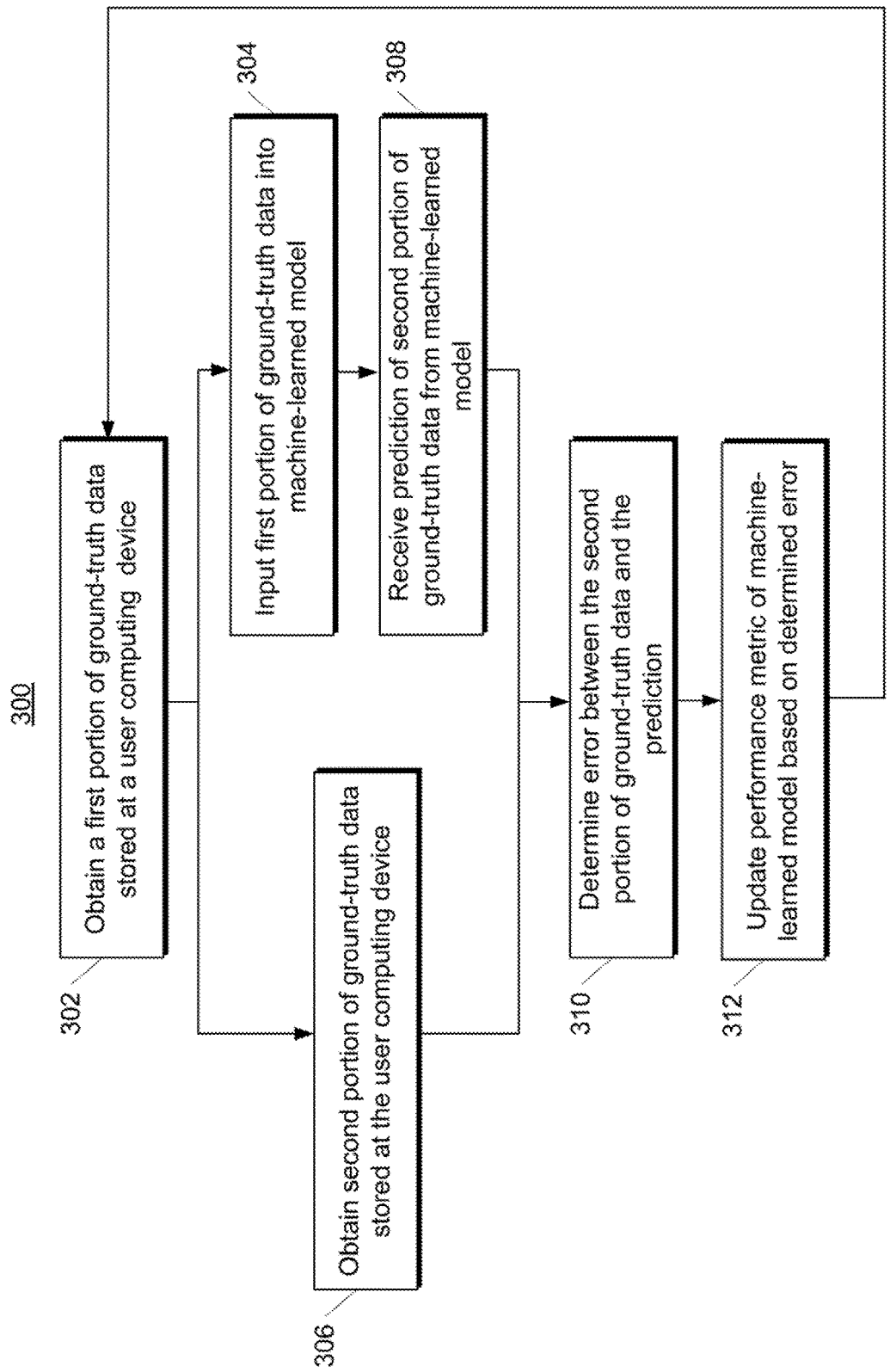
FIG. 3 depicts a flow chart diagram of an example method to evaluate a machine-learned model according to example embodiments of the present disclosure.
Figure 4:
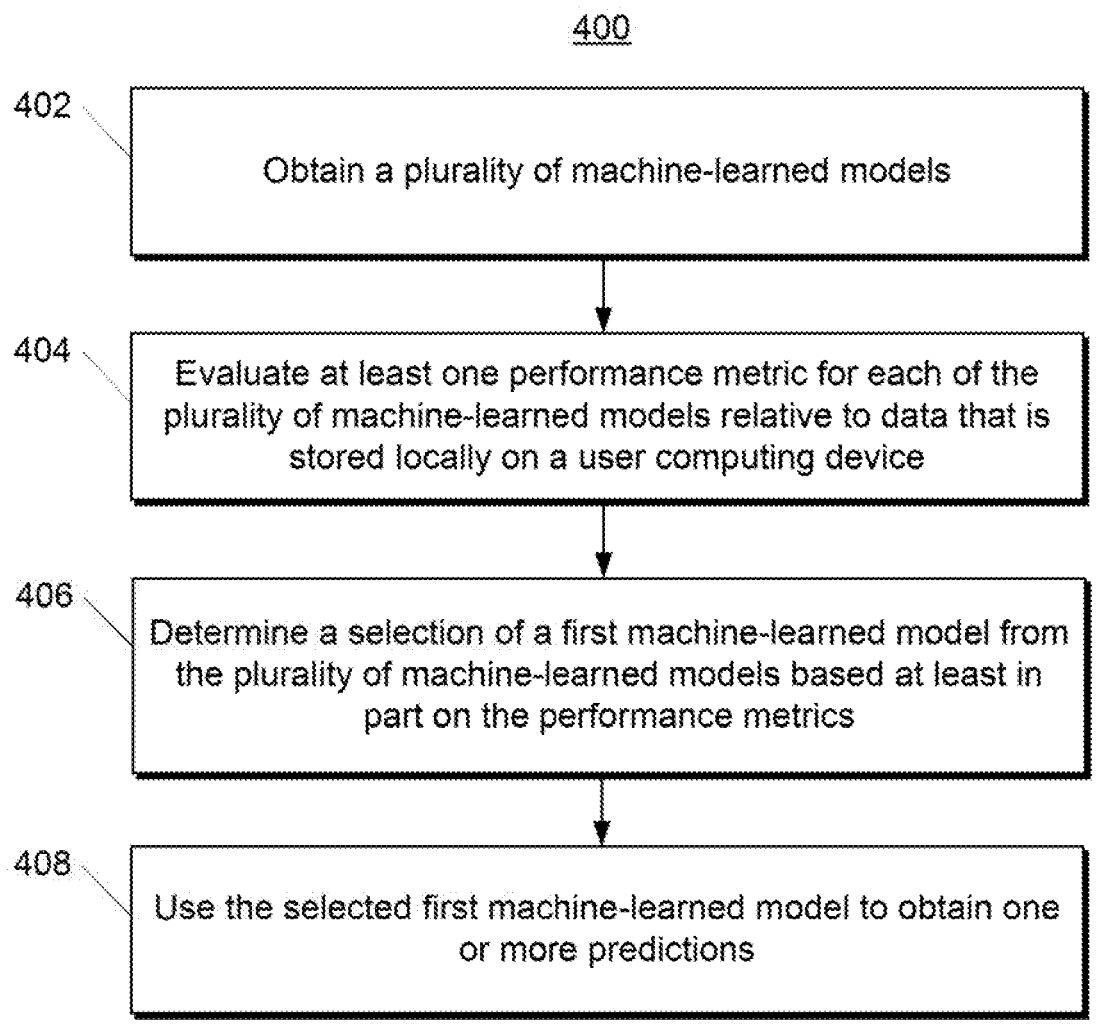
FIG. 4 depicts a flow chart diagram of an example method to manage a plurality of machine-learned models according to example embodiments of the present disclosure.

FIGS. 2-5 illustrate example methods of the present disclosure. Although FIGS. 2-5 respectively depict steps performed in a particular order for purposes of illustration and discussion, the methods of the present disclosure are not limited to the particularly illustrated order or arrangement. The various steps of the methods of FIGS. 2-5 can be omitted, rearranged, combined, and/or adapted in various ways without deviating from the scope of the present disclosure. Further, although the methods of FIGS. 2-4 are discussed as being performed primarily by a user computing device, the methods can be performed by other computing devices (e.g., a server computing device) or combinations of computing devices.

FIG. 2 depicts a flow chart diagram of an example method 200 to manage a machine-learned model according to example embodiments of the present disclosure.

At 202, a user computing device obtains a machine-learned model. As one example, in some implementations, a new machine-learned model can be trained by the user computing device based on the locally logged data. In particular, an untrained model structure and a training algorithm can be provided to the user computing device (e.g., from a server computing device). The user computing device can be instructed to use the entries in the local database (or some subset thereof) as training data for the training algorithm.

As another example, the machine-learned model can be delivered to the user computing device partially or fully pre-trained. For example, the server computing device can partially or fully train the model on centrally collected data prior to transmitting the model to the user computing device. In some of such implementations, the user computing device can further train the model against the local log database. In some instances, this additional local training can be viewed as personalizing the model.

In some implementations, some information about the trained model's parameters can be delivered by the user computing device back to the server computing device. For example, the server computing device can use the returned parameter information to construct a cross-population model.

At 204, the user computing device evaluates at least one performance metric for the machine-learned model relative to data that is stored locally on the user computing device. One example performance metric is an average probability of correct prediction by the model. Another example performance metric is expected utility of the model. For example, the expected utility can include a number of user interactions saved/eliminated. As one example, in a predictive keyboard context, use of the model may result in reduction of the number of user taps or other interactions, which can be reflected as expected utility.

As one example, at 204, the user computing device can evaluate the machine-learned model based on its ability to predict future user behavior. In particular, the user computing device can use new local data that is newly logged after receipt and/or training of the machine-learned model at 202 to evaluate the at least one performance metric for the machine-learned model. For example, the model can be employed to make predictions based on newly received data, which can then be compared to other newly received data.

Alternatively or additionally, at 204, the user computing device can evaluate the machine-learned model against previously logged local data. In particular, the user computing device can use historical data that was previously logged at the user computing device to evaluate the at least one performance metric. Thus, at 204, a machine-learned model can be evaluated against previously collected historical data and/or against newly collected data.

As one example evaluation technique, FIG. 3 depicts a flow chart diagram of an example method 300 to evaluate a machine-learned model according to example embodiments of the present disclosure.

At 302, a user computing device obtains a first portion of ground-truth data stored at the user computing device. The ground-truth data can be previously logged local data or newly logged local data.

To provide one example, a machine-learned model might be evaluated on its ability to correctly predict a next word that will be entered into a text messaging application based on a previously entered string. Thus, in such example, the ground-truth data might include a first portion that corresponds to a text string entered by a user.

At 304, the user computing device inputs the first portion of the ground-truth data into a machine-learned model. To continue the example, at 304, the user computing device inputs the text string entered by the user into the machine-learned model.

At 306, the user computing device obtains a second portion of ground-truth data stored at the user computing device. To continue the example, the second portion of the ground-truth data might include a word that the user entered after entry of the text string. Thus, the model can be evaluated on its ability to correctly predict the second portion of the ground-truth data when given the first portion.

Block 306 can be done before or after block 304. In particular, as noted, the ground-truth data can be previously logged local data or newly logged local data. As such, when previously logged local data is used, obtaining the ground-truth data can simply include accessing the data from memory. However, in some implementations in which newly logged local data is used, the model can be evaluated in real time. For example, to continue the example, the model can be used to make predictions for evaluation at the same time as the user is entering the text.

At 308, the user computing device receives a prediction of the second portion of the ground-truth data from the machine-learned model. At 310, the user computing device determines an error between the second portion of the ground-truth data obtained at 306 and the prediction received at 308. As one example, the error can be binary in nature (e.g., does the prediction received at 308 match the second portion of the ground-truth data obtained at 306). As another example, the error can be determined according to an error function that evaluates a (non-binary) magnitude of error between the second portion of the ground-truth data obtained at 306 and the prediction received at 308. Any error function can be used.

At 312, the user computing device updates a performance metric of the machine-learned model based on the error determined at 310. As one example, the performance metric can be an average of the errors over time. Thus, at 312, the average can be updated based on the newly determined error.

After 312, the method 300 can terminate or can return to block 302 and again evaluate the machine-learned model relative to a new first and second portion of the ground-truth data. Thus, method 300 can be performed iteratively over a number of corresponding first and second portions of ground-truth data.

Referring again to FIG. 2, at 206, the user computing device determines whether to activate the machine-learned model based at least in part on the at least one performance metric. For example, if the performance metric(s) compare favorably to one or more performance thresholds, then the model can be activated for use at the user computing device. In some implementations, the user computing device can determine whether to activate the model. In other implementations, the user computing device can provide the performance metric(s) to the server computing device and the server computing device can determine whether to activate the model.

At 208, the user computing device evaluates the determination made at 206. If the machine-learned model should be activated then method 200 proceeds to 210. At 210, the user computing device uses the machine-learned model to obtain one or more predictions. For example, predictions made by the machine-learned model can be used by one or more applications or other computing device components to provide user features. As one example, the activated model can be used to predict a next word which can be surfaced within an autocomplete feature of the text messaging application on the user computing device.

However, referring again to bock 208, if the machine-learned model should not be activated, then method 200 proceeds to 212. At 212, the user computing device does not activate the model. Thus, if the model does not perform favorably then it will not be used to provide user facing features.

FIG. 4 depicts a flow chart diagram of an example method 400 to manage a plurality of machine-learned models according to example embodiments of the present disclosure.

At 402, a user computing device obtains a plurality of machine-learned models. In particular, rather than receive and/or train a single machine-learned model as described at block 202 of FIG. 2, the user computing device can receive and/or train a plurality of machine-learned models. For example, a server computing device can have trained the plurality of machine-learned models on different types of training data.

To provide a particular example, a server computing device can have trained three different machine-learned models to predict a next word will be entered into a text messaging application (e.g., based on a previously entered string). However, the machine-learned models can have been trained on different types of training data. For example, a first model can have been trained on publically-available literature (e.g., books); a second model can have been trained on publically-available social media posts; and a third model can have been trained on publically-available electronic mail conversations. The server computing device can provide the three models to the user computing device.

At 404, the user computing device evaluates at least one performance metric for each of the plurality of machine-learned models relative to data that is stored locally on the user computing device. For example, the locally stored data can be newly received data or can be previously logged data, as described above. As one example, at 404, the user computing device can respectively perform method 300 of FIG. 3 for each of the plurality of machine-learned models.

To continue the particular example provided above, the user computing device can evaluate at least one performance metric for each of the three models received at 402 relative to locally stored data. For example, the locally stored data can include previously logged instances of text input by the user into the text messaging application and/or newly logged instances of text input by the user into the text messaging application. As an example, the user computing device can determine, for each of the models, an average probability of correctly predicting the next word when given a portion of one of the logged instances of text input.

At 406, the user computing device determines a selection of a first machine-learned model from the plurality of machine-learned models based at least in part on the performance metrics evaluated at 404. In some implementations, determining the selection at 406 can include performing the selection at locally the user computing device. In other implementations, determining the selection at 406 can include transmitting the performance metrics to the server computing device and then receiving the selection from the server computing device. As an example, the model with the best performance metric(s) can be selected at 406.

To continue the particular example provided above, the user computing device and/or server computing device can select one of the three models based on the evaluated performance metrics. As an example, if the model trained on the publically-available electronic mail conversations was found to have the highest average probability of correctly predicting the next word, then such model can be activated and used at the user computing device. For example, the selected model can be used to predict a next word which can be surfaced within an autocomplete feature of the text messaging application on the user computing device.

At 408, the user computing device uses the selected first machine-learned model to obtain one or more predictions. To continue the particular example provided above, the selected model can be used to predict a next word which can be surfaced within an autocomplete feature of the text messaging application on the user computing device. Many different types of models can provide many different types of predictions that can be used for many different uses, including both user-facing features and non-user-facing features.

In further implementations, the model selected at 406 can be personalized based on the locally stored data prior to use at 408. In yet further implementations, if two or more models perform favorably relative to one or more thresholds, then the two or more models can be aggregated to form a single model that is then activated (or personalized and activated). In one example, the two or more models that performed favorably relative to the one or more thresholds can be aggregated according to a weighted average, where the weight applied to each of the two or more models is a function of the respective performance metric evaluated for such model.

Figure 5:
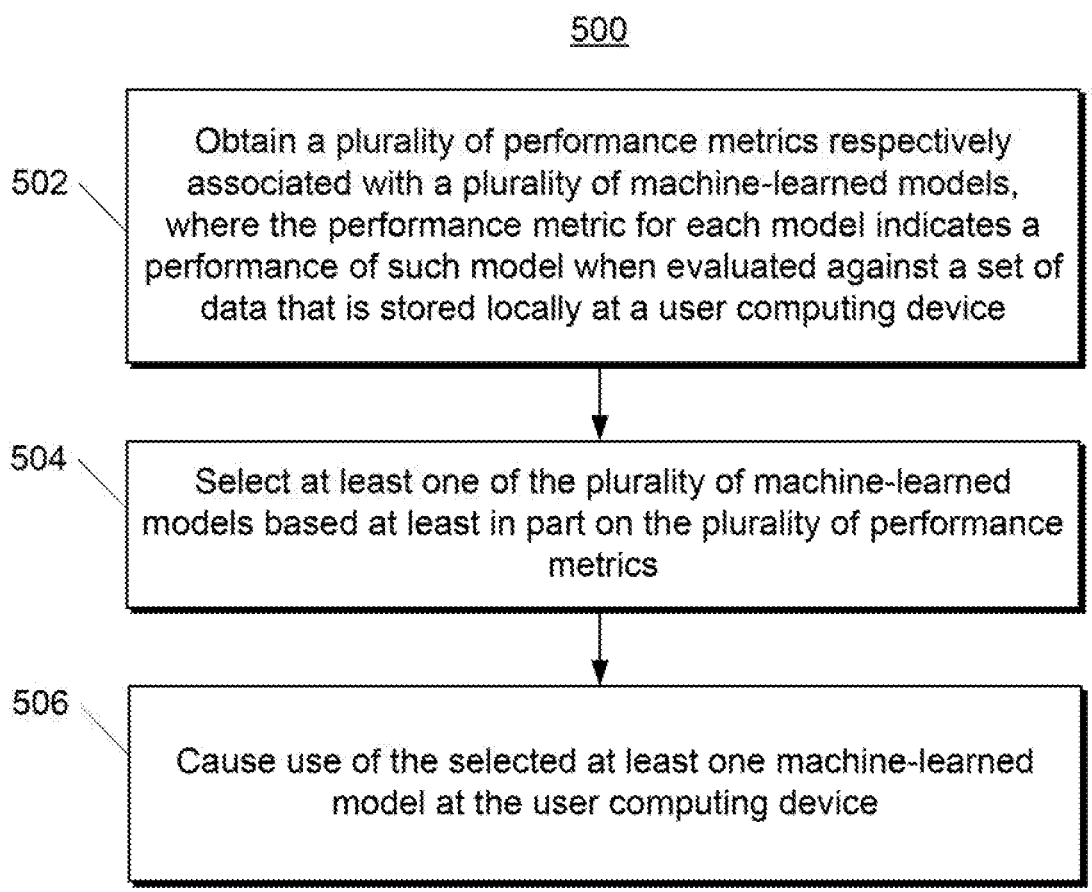
FIG. 5 depicts a flow chart diagram of an example method to manage a plurality of machine-learned models according to example embodiments of the present disclosure.

FIG. 5 depicts a flow chart diagram of an example method 500 to manage a plurality of machine-learned models according to example embodiments of the present disclosure.

At 502, a server computing device obtains a plurality of performance metrics respectively associated with a plurality of machine-learned models. The performance metric for each model indicates a performance of such model when evaluated against a set of data that is stored locally at a user computing device.

At 504, the server computing device selects at least one of the plurality of machine-learned models based at least in part on the plurality of performance metrics. As an example, the model with the best performance metric(s) can be selected at 504.

At 506, the server computing device causes use of the selected at least one machine-learned model at the user computing device. For example, the server computing device can instruct the user computing device to activate and use the selected at least one machine-learned model.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to manage machine-learned models, the method comprising:

obtaining, by a user computing device from a centralized computing system, a plurality of machine-learned models, wherein the user computing device is associated with a particular user, wherein each of the plurality of machine-learned models has been previously trained by the centralized computing system on a centralized collection of data;

prior to activation of any of the plurality of machine-learned models for use at the user computing device:

evaluating, by the user computing device, at least one performance metric for each of the plurality of machine-learned models, wherein the at least one performance metric for each machine-learned model is evaluated relative to historical data that was previously logged at the user computing device and is stored locally at the user computing device and associated with the particular user and that is not included in the centralized collection of data, wherein the at least one performance metric for each of the plurality of machine-learned models is evaluated without transmission of any of the historical data to the centralized computing system, and wherein the at least one performance metric comprises a measure of an ability of the machine-learned model to correctly predict portions of the historical data descriptive of behavior of the particular user;

comparing, by the user computing device, the measure of the ability of each of the plurality of machine-learned model to predict portions of the historical data descriptive of behavior of the particular user; and determining, by the user computing device, a selection of a first machine-learned model from the plurality of machine-learned models for activation based at least in part on the comparison of the measure of the ability of each of the plurality of machine-learned model to predict portions of the historical data descriptive of behavior of the particular user, wherein determining the selection comprises selecting, by the user computing device, the machine-learned model with a highest measure of the ability to correctly predict portions of the historical data descriptive of behavior of the particular user among the plurality of machine-learned models;

activating, by the user computing device, the selected first machine-learned model for use at the user computing device; and after activation of the first machine-learned model, using, by the user computing device, the first machine-learned model to obtain one or more predictions.

2. The computer implemented method of claim 1, wherein using, by the user computing device, the historical data that was previously logged at the user computing device to evaluate the at least one performance metric for each of the plurality of machine-learned models comprises:

inputting, by the user computing device, at least a first portion of the historical data into each of the plurality of machine-learned models;

receiving, by the user computing device, at least one prediction from each of the plurality of machine-learned models in response to input of the first portion of the historical data; and comparing, by the user computing device, the at least one prediction from each machine-learned model to a second portion of the historical data to respectively determine the at least one performance metric for each of the plurality of machine-learned models.

3. The computer-implemented method of claim 1, wherein evaluating, by the user computing device, the at least one performance metric for each of the plurality of machine-learned models comprises, after obtaining, by the user computing device, the plurality of machine-learned models, using, by the user computing device, new data that is newly logged at the user computing device to evaluate the at least one performance metric for each of the plurality of machine-learned models.

4. The computer-implemented method of claim 3, wherein using, by the user computing device, new data that is newly logged at the user computing device to evaluate the at least one performance metric for each of the plurality of machine-learned models comprises:

inputting, by the user computing device, at least a first portion of the new data into each of the plurality of machine-learned models;

receiving, by the user computing device, at least one prediction from each of the plurality of machine-learned models in response to input of the first portion of the new data; and comparing, by the user computing device, the at least one prediction from each machine-learned model to a second portion of the new data to respectively determine the at least one performance metric for each of the plurality of machine-learned models.

5. The computer-implemented method of claim 1, wherein determining, by the user computing device, the selection of the first machine-learned model from the plurality of machine-learned models comprises:

selecting, by the user computing device, the first machine-learned model from the plurality of machine-learned models based at least in part on the performance metrics respectively evaluated for the plurality of machine-learned models.

6. The computer-implemented method of claim 1, wherein determining, by the user computing device, the selection of the first machine-learned model from the plurality of machine-learned models comprises:

providing, by the user computing device, the performance metrics respectively evaluated for the plurality of machine-learned models to a server computing device; and receiving, by the user computing device, the selection of the first machine-learned model from the server computing device.

7. The computer-implemented method of claim 1, wherein evaluating, by the user computing device, at least one performance metric for each of the plurality of machine-learned models comprises evaluating, by the user computing device for each of the plurality of machine-learned models, an average probability of correct prediction.

8. The computer-implemented method of claim 1, wherein obtaining, by the user computing device, the plurality of machine-learned models comprises obtaining, by the user computing device, the plurality of machine-learned models that have been respectively trained on different types of training data.

9. The computer-implemented method of claim 1, further comprising:

reporting, by the user computing device, one or more of the performance metrics evaluated for the plurality of machine-learned models to a server computing device.

10. The computer-implemented method of claim 9, further comprising:

aggregating, by the server computing device, the one or more performance metrics received from the user computing device with other performance metrics reported by other computing devices to assess a global performance for each of the plurality of machine-learned models.

11. The computer-implemented method of claim 1, wherein activating, by the user computing device, the selected first machine-learned model for use at the user computing device comprises enabling, by the user computing device, the one or more predictions to be included within a user-visible feature.

12. A computing device, the computing device comprising:

one or more processors; and one or more non-transitory computer-readable media that collectively store instructions that, when executed by the one or more processors, cause the computing device to:

obtain a machine-learned model from a centralized computing system, wherein the machine-learned model has been previously trained by the centralized computing system on a centralized collection of data;

prior to activation of the machine-learned model for use at the computing device that is visible to a user of the computing device:

evaluate at leak one performance metric for the machine-learned model, wherein the at least one performance metric for the machine-learned model is evaluated relative to historical data that was previously logged at the user computing device and is stored locally at the computing device and associated with the user of the computing device and that is not included in the centralized collection of data, wherein the at least one performance metric for the machine-learned model is evaluated without transmission of any of the historical data to the centralized computing system, and wherein the at least one performance metric comprises a measure of an ability of the machine-learned model to correctly predict portions of the historical data descriptive of behavior of the user of the computing device; and determine whether to activate the machine-learned model based at least in part on the measure of the ability of the machine-learned model to correctly predict portions of the historical data descriptive of behavior of the particular; and when it is determined that the machine-learned model should be activated, activate and use the machine-learned model to obtain one or more predictions that are visible to the user of the computing device.

13. The computing device of claim 12, wherein the computing device uses historical data that was previously logged at the user computing device prior to receipt of the machine-learned model to evaluate the at least one performance metric the machine-learned model.

14. The computing device of claim 12, wherein the computing device uses new data that is newly logged at the user computing device after receipt of the machine-learned model to evaluate the at least one performance metric for each of the plurality of machine-learned models.

15. The computing device of claim 12, wherein to determine whether to activate the machine-learned model based at least in part on the at least one performance metric the computing device:

compares the at least one performance metric to at least one threshold value; and determines whether the at least one performance metric compares favorably to the at least one threshold value, wherein it is determined that the machine-learned model should be activated when the at least one performance metric compares favorably to the at least one threshold value.

16. The computing device of claim 12, wherein to determine whether to activate the machine-learned model based at least in part on the at least one performance metric the computing device:

provides the at least one performance metric evaluated for the machine-learned model to a server computing device; and receives a determination of whether to activate the machine-learned model from the server computing device.

17. The computing device of claim 12, wherein the at least one performance metric comprises an average probability of correct prediction.

18. One or more non-transitory computer-readable media that collectively store instructions that, when executed by one or more processors of a server computing device, cause the server computing device to:

prior to activation of any of a plurality of machine-learned models at a user computing device, wherein the user computing device is associated with a particular user:

obtain, from the user computing device, a plurality of performance metrics respectively associated with the plurality of machine-learned models, wherein the performance metric for each machine-learned model indicates a performance of such machine-learned model when evaluated at the user computing device against a set of historical data that was previously logged at the user computing device and is stored locally at the user computing device associated with the particular user, wherein the plurality of machine-learned models have been previously trained on a centralized collection of data, wherein the said historical data is not included in the centralized collection of data, and wherein at least one of the plurality of performance metrics comprises a measure of an ability of the machine-learned model to correctly predict portions of the historical data descriptive of behavior of the particular user;

select at least one of the plurality of machine-learned models based at least in part on a comparison of the measure of the ability of each of the plurality of the machine-learned models to correctly predict portions of the historical data descriptive of behavior of the particular user; and cause activation and use of the selected at least one machine-learned model at the user computing device.

19. The one or more non-transitory computer-readable media of claim 18, wherein execution of the instructions further causes the server computing device to aggregate the plurality of performance metrics received from the user computing device with a plurality of additional performance metrics received from additional computing devices to determine a global performance for each of the plurality of machine-learned models.

* * * * *